US010092912B2

(12) United States Patent
Adey et al.

(10) Patent No.: US 10,092,912 B2
(45) Date of Patent: Oct. 9, 2018

(54) SEPARATOR DEVICE

(71) Applicant: Adey Holdings (2008) Limited, Cheltenham (GB)

(72) Inventors: Christopher Adey, Battledown (GB); Simon Downie, Leckhampton (GB)

(73) Assignee: Adey Holdings (2008) Limited, Cheltenham (GB)

(*) Notice: Subject to any disclaimer, the term of this patent is extended or adjusted under 35 U.S.C. 154(b) by 814 days.

(21) Appl. No.: 14/402,365

(22) PCT Filed: May 17, 2013

(86) PCT No.: PCT/GB2013/051286
§ 371 (c)(1),
(2) Date: Nov. 20, 2014

(87) PCT Pub. No.: WO2013/175184
PCT Pub. Date: Nov. 28, 2013

(65) Prior Publication Data
US 2015/0129491 A1    May 14, 2015

(30) Foreign Application Priority Data
May 21, 2012 (GB) .................................. 1208920.7

(51) Int. Cl.
*B04C 3/06* (2006.01)
*B04C 5/185* (2006.01)
(Continued)

(52) U.S. Cl.
CPC ............ *B04C 3/06* (2013.01); *B01D 21/0009* (2013.01); *B01D 21/0042* (2013.01);
(Continued)

(58) Field of Classification Search
CPC ............ B01D 21/0009; B01D 21/0042; B01D 21/2405; B01D 21/2483; B01D 21/26;
(Continued)

(56) References Cited

U.S. PATENT DOCUMENTS 1,175,948 A    3/1916  French
2,277,646 A    3/1942  Johnson
(Continued)

FOREIGN PATENT DOCUMENTS

DE    2655623 A1 *  6/1977 ............. B01D 29/15
EP    0025628 A2 *  3/1981 ........... B01D 29/114
(Continued)

OTHER PUBLICATIONS

Aquamax S.R.L., Supameg Filter, http://catalogo.aquamax.it/categorie/manutenzione/pompe-disincrostanti/supameg-filter/ (accessed on Nov. 8, 2017).

*Primary Examiner* — Lucas A Stelling
*Assistant Examiner* — Angel Olivera
(74) *Attorney, Agent, or Firm* — Andrew S. Langsam; Pryor Cashman LLP

(57) ABSTRACT

A separator device is provided for removing particles from suspension in a fluid comprises a housing having first and second ports for ingress and egress of fluid into and out of the housing, the first and second ports being on the same vertical line; and at least one separation chamber for separating solid particles from the fluid.

12 Claims, 3 Drawing Sheets

(51) Int. Cl.
*B01D 21/00* (2006.01)
*B03C 1/28* (2006.01)
*F24D 19/00* (2006.01)
*B01D 21/24* (2006.01)
*B01D 21/26* (2006.01)
B01D 35/06 (2006.01)
B03C 1/30 (2006.01)
B03C 1/00 (2006.01)
B01D 46/00 (2006.01)
B04C 5/08 (2006.01)
B04C 5/06 (2006.01)
B04C 5/187 (2006.01)
B04C 3/00 (2006.01)

(52) U.S. Cl.
CPC ..... *B01D 21/2405* (2013.01); *B01D 21/2483* (2013.01); *B01D 21/265* (2013.01); *B03C 1/286* (2013.01); *B04C 5/185* (2013.01); *F24D 19/0092* (2013.01); B01D 21/26 (2013.01); B01D 21/262 (2013.01); B01D 21/267 (2013.01); B01D 35/06 (2013.01); B01D 46/0034 (2013.01); B01D 2247/02 (2013.01); B01D 2259/80 (2013.01); B01D 2259/814 (2013.01); B03C 1/00 (2013.01); B03C 1/30 (2013.01); B03C 2201/18 (2013.01); B04C 5/06 (2013.01); B04C 5/08 (2013.01); B04C 5/187 (2013.01); B04C 2003/003 (2013.01)

(58) Field of Classification Search
CPC .. B01D 21/262; B01D 21/265; B01D 21/267; B03C 1/286; B03C 2201/18; B04C 3/06; B04C 2003/003; B04C 5/185187; B04C 5/08; B04C 5/06; F24D 19/0092
See application file for complete search history.

(56) References Cited

U.S. PATENT DOCUMENTS

| | | | |
|---|---|---|---|
| 3,828,930 A * | 8/1974 | Eimer | B01D 29/115 210/137 |
| 4,113,618 A | 9/1978 | Koseki et al. | |
| 5,080,792 A * | 1/1992 | McGovern | B01D 17/0208 209/725 |
| 2010/0200471 A1 | 8/2010 | Adey | |

FOREIGN PATENT DOCUMENTS

| | | |
|---|---|---|
| EP | 1626809 A1 | 2/2006 |
| FR | 2778178 A1 | 11/1999 |
| GB | 1530296 | 10/1978 |
| GB | 2402894 A | 12/2004 |
| GB | 2486172 A | 6/2012 |
| GB | 2486173 A | 6/2012 |
| GB | 2491246 A | 11/2012 |
| WO | 2009052102 A2 | 4/2009 |
| WO | PCT/GB13/051286 | 7/2013 |

* cited by examiner

SEPARATOR DEVICE

The present invention relates to a separator device suitable for separating particles from a fluid flow and particularly but not exclusively to a separator device for use in a hydronic heating system.

BACKGROUND TO THE INVENTION

In a typical heating system, water is circulated by a pump through several radiators, possibly a heat exchanger in a hot water cylinder, and a boiler. During circulation, solid particles (for example, iron oxide) which have come loose from the interior of the radiators and pipework can become suspended in the water. Solid particles can also be present as contaminants in the water originally supplied to the system, and the water can become contaminated by dirt where an open expansion tank forms part of the system. These solid particles can cause malfunction if they build up in the boiler or pump, and reduce the effectiveness of the heating system by restricting the flow of water and clogging radiators. The water in a heating system should therefore be continually cleaned to remove solid particles as far as possible.

Various devices are known for removing particles from suspension in a flow of water. Typically these devices include a magnet for attracting ferrous particles, and may also include mechanical separation means for removing nonmagnetic particles. Nonmagnetic particles may be removed by causing a portion of the water to flow through a separation chamber, within which obstruction means are disposed to slow the flow. Particles will then fall out of suspension and become trapped in cavities, which can easily be cleaned during an annual service. Only a portion of the flow is slowed, so that the overall flow rate in the heating circuit is not significantly reduced. A device of this type is disclosed in the applicant's co-pending applications GB2486173 and GB2486172.

These prior devices typically consist of a cylindrical housing, a magnet disposed within the housing along its longitudinal axis, and a mechanical separation chamber disposed at a lower end of the housing. An inlet and an outlet are provided on a side wall of the housing, typically one above the other. The inlet and outlet are configured to set up a swirl of water within the housing. In order to achieve this, the inlet and outlet are typically tangential or substantially tangential to the cylindrical housing. The inlet and outlet are disposed on different tangents of the cylindrical housing, and so are offset from each other both vertically and horizontally when the cylindrical housing is installed in an upright position, with the longitudinal axis of the housing on a vertical line. In use, the incoming flow will immediately come into contact with the inner surface of the curved wall of the housing, and will experience a force perpendicular to the surface in the direction of the centre of the cylinder. The motion of fluid within the housing is therefore substantially circular.

Due to the very tight space within which a device may need to be installed, particularly if it is being retrofitted to an existing installation, tangential inlet and outlet ports may impose an unwelcome constraint upon the installer. Such devices typically need to be fitted to a straight vertical pipe, and the installer will therefore need to install right angle connectors and horizontal pipe portions in order to accommodate the tangential ports which are offset vertically and horizontally. In some cases it may simply not be possible to fit a device of suitable capacity with tangential or substantially tangential inlets.

It is an object of this invention to provide a separator device which reduces or substantially obviates the above mentioned problems.

STATEMENT OF INVENTION

According to the present invention, there is provided a separator device for removing particles from suspension in a fluid, comprising:
- a housing, having a central longitudinal axis and first and second ports for ingress and egress of fluid into and out of the housing; and
- at least one separation chamber for separating solid particles from the fluid, the first and second ports being centrally disposed on an axis and extending perpendicularly from the housing, the axis running parallel to the central longitudinal axis of the housing, and at least one deflector being provided in or adjacent to at least one of the first and second ports, for setting up a flow of fluid in circular motion about the central longitudinal axis.

The separation chamber may be substantially the entire interior of the housing, and may include a magnet for removing magnetic particles from the fluid. Further separation chambers may be provided. For example, non-magnetic separation chamber(s) may be provided near the top and/or bottom ends of the housing.

Vertically in-line ports enable ease of fitting to a heating circuit. A section may be removed from the flow or return pipe of the heating circuit, and the open ends of the flow or return pipe connected to the first and second ports of the device via right-angle connectors. Since the first and second ports are on the same vertical line, no extra pipework will be required, and only one right-angle connector is needed on each of the inlet and outlet ports.

A circular flow of fluid enables effective separation of magnetic and nonmagnetic particles, by increasing the time for which a particular portion of fluid remains within the housing, without substantially affecting the fluid dynamics in the heating circuit, for example by reducing fluid pressure between inlet and outlet.

First and second deflectors may be provided adjacent to each of the first and second ports.

Providing deflectors on both of the ports allows either to be used as the inlet, providing the installer with additional flexibility when installing the device.

The deflector or deflectors may be angled from the vertical. The or each deflector may be angled to direct flow towards the end of the housing closest to the port adjacent to which the deflector is disposed. Angled deflectors deflect fluid not only into a swirl, but also towards separation chamber(s) disposed at end(s) of the housing. This increases the effectiveness of separation.

The deflector or deflectors may be moulded into the housing.

The housing may have a curved surface, and may be substantially cylindrical.

At least one port may be circular, and the deflector adjacent to that port, where provided, may have an extent substantially one quarter of the diameter of the port.

DESCRIPTION OF THE DRAWINGS

For a better understanding of the present invention, and to show more clearly how it may be carried into effect, reference will now be made, by way of example only, to the accompanying drawings, in which.

DESCRIPTION OF THE PREFERRED EMBODIMENT(S)

Figure 1:
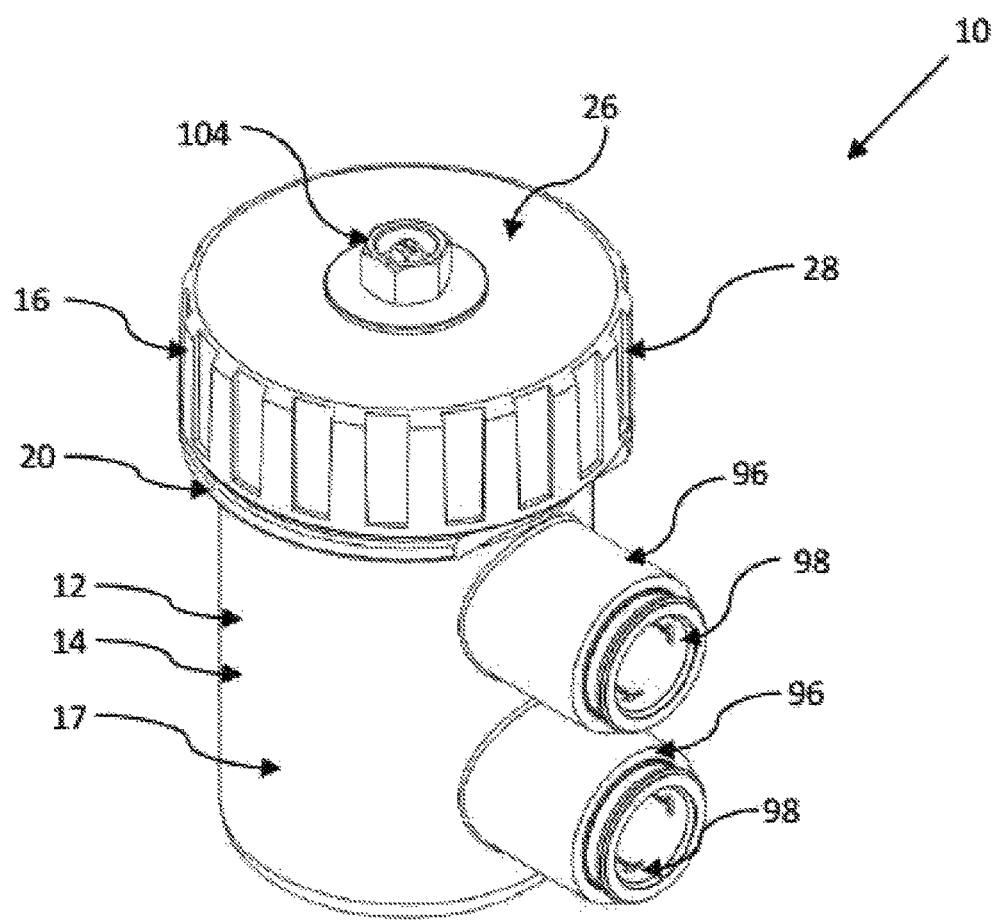
FIG. 1 shows a perspective view of a separator device according to the present invention.
Figure 2:
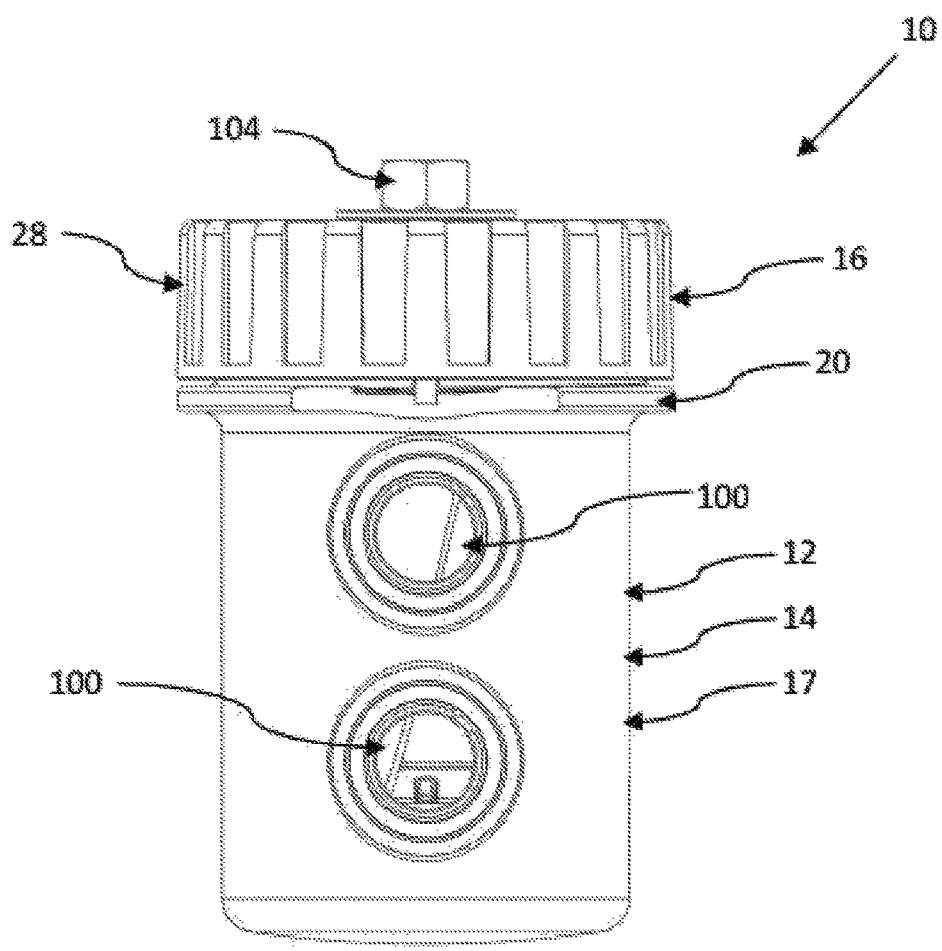
FIG. 2 shows a front view of the separator device of FIG. 1.
Figure 3:
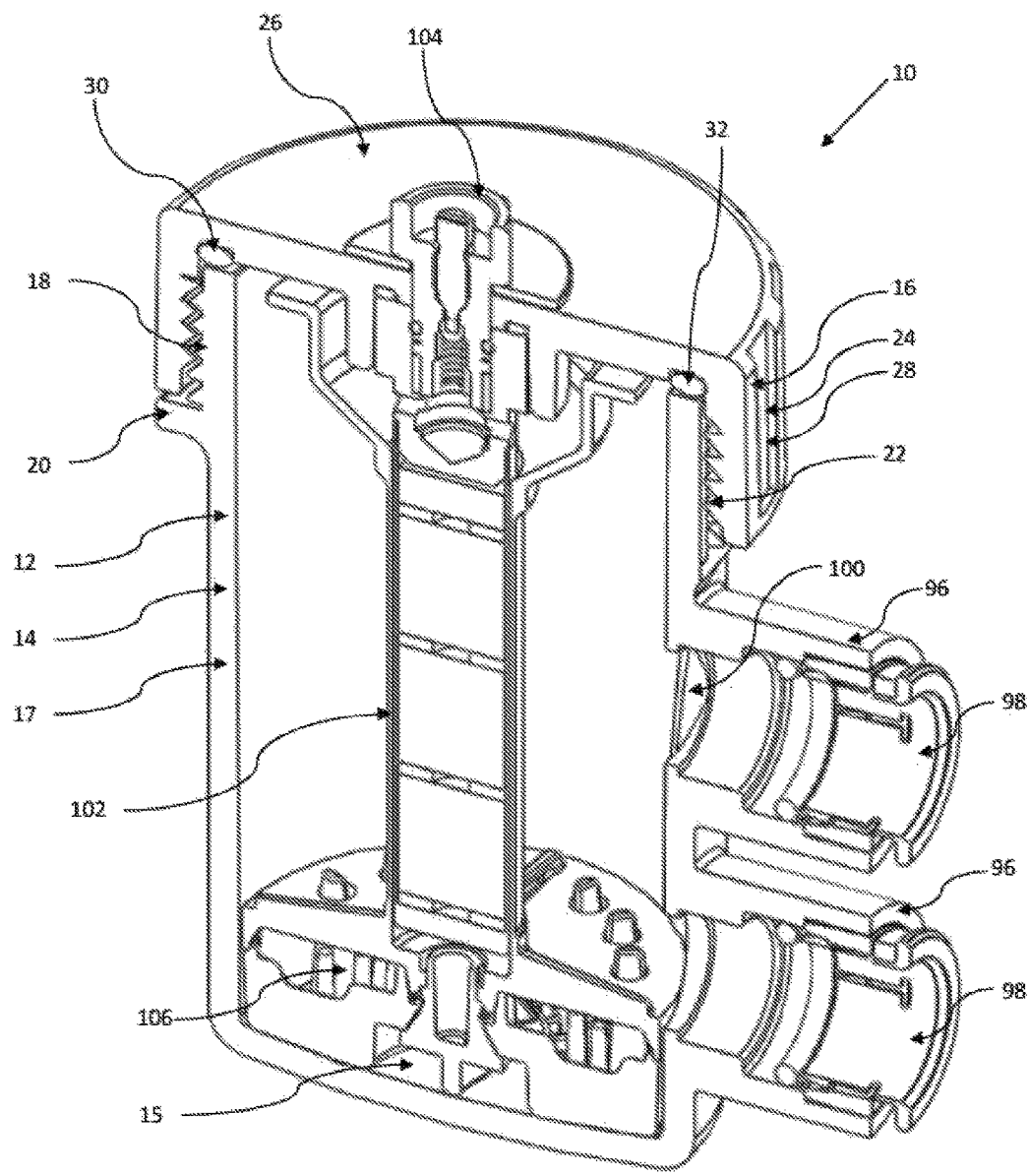
FIG. 3 shows a perspective cut-away view of the separator device of FIG. 1.

Referring to FIGS. 1 to 3, a separator device for separating particles from suspension in a fluid is indicated generally at 10. A housing 12 is provided, comprising of a body portion 14 and a removable closure portion 16. The body portion is substantially a cylindrical shell open at the upper end, that is, the body portion 14 comprises a floor 15 and a wall 17. The upper end of the wall 17 of the body portion 14 is formed with a male thread 18 and, directly below the male thread, a circumferential rim 20.

The closure portion 16 is in the form of a screw-on cap comprising a circular planar roof 26 and a circumferential closure portion wall 28 extending below the edge of the roof. A thread 22 is formed on the interior surface of the closure portion wall 28, for co-operating with the male threads 18 at the upper end of the wall 17 of the housing body portion 14. A plurality of recesses 24 are provided and spaced uniformly around the outside of the closure portion wall 28 of the closure portion 16 in order to assist a user in gripping the closure portion 16 to effect closure and removal.

A recess 30 is provided around the edge of the underside of the roof 26 of the closure portion 16. A rubber O-ring 32 sits within the recess 30, around half of the height of the O-ring 32 extending below the underside of the roof 26. When the closure portion 16 is screwed onto the body portion 14 of the housing 12, the O-ring 32 is compressed between the roof 26 of the closure portion 16 and the upper edge of the wall 17 of the housing body portion 14, forming a watertight seal.

An inlet and an outlet are provided as first and second hollow cylindrical sockets 96 in the wall 17 of the housing body portion 14, each extending perpendicular to the same tangent of the cylindrical body, that is, the sockets extend outwardly from the wall of the housing body portion 14 and are parallel to each other on a diameter of the housing 12. John Guest Speedfit® connectors 98 are provided within the sockets 96, allowing easy fitting to a heating circuit.

The parallel inlet and outlet sockets 96 on the same diameter enable easy fitting to a heating circuit, since the inlet and outlet will be in the same straight vertical line when the device is installed.

Deflectors 100, best shown in FIG. 2, are provided within each of the sockets 96 in the cylindrical housing 12. The deflectors 100 block a portion of each socket 96, directing the flow on the inlet to one side and resulting in a swirling flow within the housing 12. The edges of the deflectors 100 are at an angle of around 10° from the vertical, so as to divert water slightly vertically as well as horizontally. Providing deflectors 100 in both sockets 96 allows either to be used as the inlet. The deflectors 100 are moulded as an integral part of the housing 12.

A bleed valve 104 is provided in the roof 26 of the closure portion 16 of the housing 12. The bleed valve may be used for dosing with an inhibitor as described in the Applicant's granted patent EP1626809. The description of EP1626809 is incorporated herein by reference.

A removable insert 102 comprising a sleeve for a magnet and a separation chamber 106 for separating nonmagnetic particles from the flow is provided within the housing. The removable insert 102 is described in the Applicant's co-pending application GB2486172, and the description in that application is incorporated herein by reference.

The deflectors 100 create a swirling flow of water, which is necessary to make magnetic and nonmagnetic separation effective. This is achieved with in-line rather than horizontally-offset tangential inlet and outlet ports, providing the installer with a device which is substantially easier to fit.

The embodiments described above are provided by way of example only, and various changes and modifications will be apparent to persons skilled in the art without departing from the scope of the present invention as defined by the appended claims.

The invention claimed is:

1. A filter for a hydronic heating system, the filter comprising:
    a cylindrical housing having first and second ends and a curved wall, and having a central longitudinal axis, an inlet port for ingress of fluid into the cylindrical housing, and an outlet port for egress of filtered fluid out of the cylindrical housing; and
    a first separation chamber for separating solid particles from the fluid, and a second separation chamber for separating non-magnetic particles from the fluid,
    the inlet and outlet ports being arranged in parallel and extending, in the same direction, perpendicularly from the curved wall of the cylindrical housing,
    the second separation chamber being disposed at an end of the cylindrical housing nearest to one of the inlet or outlet ports, and
    at least one deflector being provided in at least the one of the inlet and outlet ports which is nearest to the second separation chamber, the at least one deflector being angled to direct flow towards the second separation chamber and, in use, set up a flow of fluid in circular motion about the central longitudinal axis.

2. A filter as claimed in claim 1, in which a third separation chamber is provided at the other end of the cylindrical housing to the second separation chamber, for separating non-magnetic particles from the fluid, and the at least one deflector includes first and second deflectors which are provided within the inlet and outlet ports respectively, wherein the one of the first and second deflectors which is provided within the inlet port is angled to direct flow towards the nearest one of the second separation chamber or the third separation chamber.

3. A filter as claimed in claim 1, in which the first separation chamber includes a magnet for separating magnetic particles from the fluid.

4. A filter as claimed in claim 1, in which the at least one deflector includes first and second deflectors which are provided within the inlet and outlet ports respectively.

5. A filter as claimed in claim 1, in which the at least one deflector is angled from the vertical with respect to the central longitudinal axis of the cylindrical housing, to provide vertical deflection of flow towards the near end of the housing and horizontal deflection of flow into the circular motion about the central longitudinal axis.

6. A filter as claimed in claim 1, in which the at least one deflector is fixed in position or moulded as an integral part of the cylindrical housing.

7. A filter as claimed in claim 1, in which at least one of the inlet and outlet ports is circular in cross-section, and the at least one deflector has an extent one quarter of the diameter of an adjacent inlet or outlet port, blocking a minor segment of the relevant circular cross-section port.

8. A filter for a hydronic heating system, the filter comprising:
   a cylindrical housing having first and second ends and a curved wall, and having a central longitudinal axis, an inlet port for ingress of fluid into the cylindrical housing, and a single outlet port for egress of filtered fluid out of the cylindrical housing; and
   a first separation chamber for separating solid particles from the fluid, and a second separation chamber for separating non-magnetic particles from the fluid,
   the inlet and outlet ports being arranged in parallel and extending, in the same direction, perpendicularly from the curved wall of the cylindrical housing,
   the second separation chamber being disposed at an end of the cylindrical housing nearest to one of the inlet or outlet ports, and
   at least one deflector being provided in at least the one of the inlet and outlet ports which is nearest to the second separation chamber, the at least one deflector being angled to direct flow towards the second separation chamber and, in use, set up a flow of fluid in circular motion about the central longitudinal axis.

9. A filter as claimed in claim 8, in which a third separation chamber is disposed at the other end of the cylindrical housing to the second separation chamber, for separating non-magnetic particles from the fluid, and the at least one deflector includes first and second deflectors which are provided within the inlet and outlet ports respectively, wherein the one of the first and second deflectors which is provided within the inlet port is angled to direct flow towards the nearest one of the second separation chamber or the third separation chamber.

10. A filter as claimed in claim 8, in which the at least one deflector includes first and second deflectors which are provided within the inlet and outlet ports respectively.

11. A filter as claimed in claim 8, in which the at least one deflector is angled from the vertical with respect to the central longitudinal axis of the cylindrical housing, to provide vertical deflection of flow towards the near end of the housing and horizontal deflection of flow into the circular motion about the central longitudinal axis.

12. A filter as claimed in claim 8, in which at least one of the inlet and outlet ports is circular in cross-section, and the at least one deflector has an extent one quarter of the diameter of an adjacent inlet or outlet port, blocking a minor segment of the relevant circular cross-section port.

* * * * *